(12) United States Patent  
Xin

(10) Patent No.: US 7,460,758 B2  
(45) Date of Patent: Dec. 2, 2008

(54) FIBER MANAGEMENT SYSTEM

(75) Inventor: Xin Xin, Liberty Lake, WA (US)

(73) Assignee: Telect Inc., Liberty Lake, WA (US)

( * ) Notice: Subject to any disclaimer, the term of this patent is extended or adjusted under 35 U.S.C. 154(b) by 28 days.

(21) Appl. No.: 11/230,791

(22) Filed: Sep. 20, 2005

(65) Prior Publication Data

US 2006/0275008 A1    Dec. 7, 2006

Related U.S. Application Data

(60) Provisional application No. 60/687,628, filed on Jun. 3, 2005.

(51) Int. Cl.  
*G02B 6/00* (2006.01)

(52) U.S. Cl. .................. 385/135; 385/134

(58) Field of Classification Search .......... 385/134–137  
See application file for complete search history.

(56) References Cited

U.S. PATENT DOCUMENTS

| 4,664,471 | A | | 5/1987 | Mignien et al. |
| 4,773,729 | A | | 9/1988 | Mignien |
| 4,824,196 | A | * | 4/1989 | Bylander .................. 385/134 |
| 5,100,221 | A | | 3/1992 | Carney et al. |
| 5,323,480 | A | | 6/1994 | Mullaney et al. |
| 5,363,466 | A | | 11/1994 | Milanowski et al. |
| 5,708,751 | A | | 1/1998 | Mattei |
| 5,956,449 | A | * | 9/1999 | Otani et al. ................. 385/134 |
| 5,982,972 | A | | 11/1999 | Tucker et al. |
| 6,009,224 | A | | 12/1999 | Allen |
| 6,250,816 | B1 | | 6/2001 | Johnston et al. |
| 6,263,141 | B1 | * | 7/2001 | Smith ....................... 385/135 |
| 6,322,378 | B1 | | 11/2001 | Auclair |
| 6,360,050 | B1 | | 3/2002 | Moua et al. |
| 6,385,381 | B1 | | 5/2002 | Janus et al. |
| 6,418,264 | B1 | * | 7/2002 | Hough et al. ............... 385/135 |
| 6,418,266 | B1 | | 7/2002 | Vitantonio |
| 6,434,316 | B1 | | 8/2002 | Grois et al. |
| 6,438,310 | B1 | | 8/2002 | Lance et al. |
| 6,575,640 | B2 | | 6/2003 | Connelly et al. |
| 6,591,051 | B2 | | 7/2003 | Solheid et al. |

(Continued)

OTHER PUBLICATIONS

NBG: Vario:Spleissbox 3: Vario-Splice Box 3: 3 pages, at least as early as Aug. 2, 2005.

(Continued)

*Primary Examiner*—Hemang Sanghavi  
(74) *Attorney, Agent, or Firm*—Lee & Hayes, PLLC

(57) ABSTRACT

A fiber management apparatus includes a module for managing fibers. In one implementation, the module includes at least two trays. An upper one of the trays is slidable and pivotable relative to a base tray to allow access to fibers managed by the base tray. In another implementation, the module is coupled to a chassis and is pivotable through an angle greater than 90 degrees relative to the chassis. A kit for mounting a chassis includes at least two different sized sets of brackets for mounting the chassis to racks of various different widths. A method of managing fibers includes pulling a module having multiple trays out of a chassis, pulling a first exposed one of the trays outward from the chassis, and lifting the first tray to expose a second one of the trays.

19 Claims, 7 Drawing Sheets

U.S. PATENT DOCUMENTS

| | | | |
|---|---|---|---|
| 6,631,237 | B2 | 10/2003 | Knudsen et al. |
| 6,633,717 | B1 | 10/2003 | Knight et al. |
| 6,870,734 | B2 | 3/2005 | Mertesdorf et al. |
| 6,925,241 | B2 | 8/2005 | Bohle et al. |
| 6,944,387 | B2 * | 9/2005 | Howell et al. ............... 385/135 |
| 6,980,725 | B1 | 12/2005 | Swieconek |
| 7,054,536 | B2 | 5/2006 | Sun |
| 7,102,884 | B2 * | 9/2006 | Mertesdorf et al. ......... 385/135 |
| 2003/0206704 | A1 | 11/2003 | Lee et al. |
| 2004/0057691 | A1 | 3/2004 | Doss et al. |
| 2004/0175090 | A1 * | 9/2004 | Vastmans et al. ............ 385/135 |
| 2005/0111809 | A1 * | 5/2005 | Giraud et al. ............... 385/135 |
| 2005/0111810 | A1 | 5/2005 | Giraud et al. |
| 2005/0129379 | A1 * | 6/2005 | Reagan et al. ............... 385/135 |
| 2005/0281526 | A1 | 12/2005 | Vongseng et al. |
| 2007/0047896 | A1 | 3/2007 | Kowalczyk et al. |
| 2007/0104447 | A1 * | 5/2007 | Allen .......................... 385/135 |

OTHER PUBLICATIONS

Nexans: Patching, Splicing and Coiling Module: 1U-12 Splices for 12 adapters, Installation and Cabling Manual, 1 page, at least as early as Aug. 2, 2005.

Nexans: Splicing and Coiling Module: 1U-24 Splices, Left or Right Opening, Installation and Cabling Manual, 1 page, at least as early as Aug. 2, 2005.

Nexans: Storage Optical Module, Left ot Right Opening, Installation and Cabling Manual, 1 page, at least as early as Aug. 2, 2005.

ADC Telecommunications Inc. enclosure displayed at the International Engineering Consortium (IEC) Supercomm Conference, held in Chicago, IL, Jun. 6-9, 2005.

"Cable fixing Device D.E.P. Linx Notice d'Installation/Installing practice", Nexans Interface, 2 pages, no dates available.

Three photographs of a bracket made by Pirelli Cable Corporation, at least as early as Sep. 30, 2004, 1 page.

* cited by examiner

FIBER MANAGEMENT SYSTEM

TECHNICAL FIELD

The following disclosure relates generally to systems for managing and organizing fibers, such as optical fibers.

BACKGROUND

Optical fibers can be used to transmit large volumes of data and voice signals over relatively long distances, with little or no signal degradation. For this reason, optical fibers have become widely used in the telecommunication field. As the use of optical fibers has increased, new systems have been developed for managing and organizing larger numbers of optical fibers.

For example, typical optical fiber management systems include cable management structures for storing the fibers or connecting the fibers to one or more other fibers and/or fiber optic devices, such as attenuators, connectors, switches, multiplexers, splitters/combiners, or splices. Such fiber management systems are often mounted to a wall or to an equipment rack. One or more rack units are generally mounted to the wall or rack, and include one or more drawers or trays having the cable management structure for organizing the fibers. However, in such conventional systems, it is often difficult to access the optical connectors, splices, etc., to connect or disconnect the optical fibers. Accordingly, there is a need for a fiber management apparatus that provides easy, unimpeded access to the optical fibers in the apparatus.

In addition, with the increasing use of optical fibers, there is an ongoing need for compact apparatuses that provide for management of a large number of optical fibers in a relatively small space.

SUMMARY

A fiber management system to manage fibers is disclosed. In one aspect, a fiber management apparatus includes a module having at least two trays. At least an upper one of the trays is pivotable relative to at least one base tray, so that the upper tray can be lifted to allow access to fibers managed by the base tray. The upper tray is also slidable outward relative to the base tray to provide additional clearance between the upper tray and the front of the chassis, so that the upper tray can be lifted, even when, for example, fibers protrude from the front face of an overhead piece of equipment.

In another aspect, a fiber management apparatus includes a chassis, and a module coupled to the chassis at a module hinge. The module is pivotable through an angle greater than 90 degrees relative to the chassis, to provide better access to fibers managed by the module.

A kit for mounting a chassis on a rack includes at least two sets of brackets, each set of brackets being of a different size, such that the kit can be used to mount the chassis to racks of various different widths. The chassis may also include adjustable mounting features, to allow the chassis to be coupled to a rack in at least two different front-to-back positions.

A method of managing fibers includes pulling a module having multiple trays out of a chassis. A first exposed one of the trays is then pulled outward, away from a front surface of the chassis, and is lifted to expose a second one of the trays.

BRIEF DESCRIPTION OF THE DRAWINGS

The detailed description refers to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to apparatuses for managing fibers, kits for mounting fiber management apparatuses, and methods of configuring fiber management apparatuses. The apparatuses are described in the context of a rack-mounted system for managing optical fibers. However, the apparatuses described herein may be used in other environments and are applicable to other contexts. For example, the apparatuses need not be mounted to a rack, and may, for example, be wall-mounted, free standing, or the like. In addition, the apparatuses may be used to manage fibers other than optical fibers, such as wire and the like.

Fiber Management System

Figure 1:
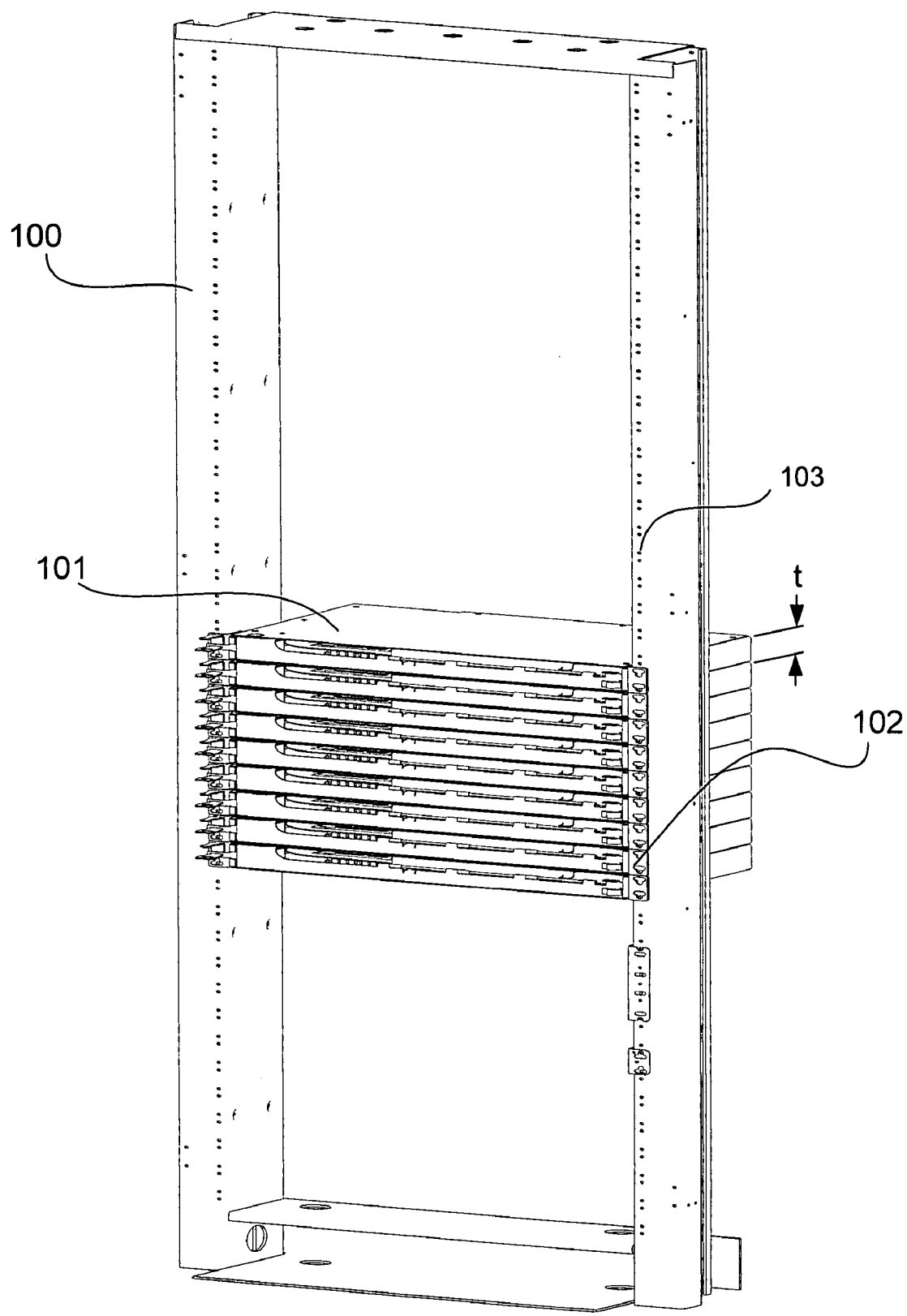
FIG. 1 is perspective view of one exemplary fiber management apparatus, including a rack with a plurality of rack units mounted thereto.

FIG. 1 illustrates a conventional free standing rack 100, on which are mounted a plurality of rack units 101. The rack units 101 are attached via brackets 102 to mounting holes 103 in the vertical sides of the rack 100.

The rack 100 shown in FIG. 1 is typical of those used by, for example, telecommunications companies to organize, route, distribute, hold, or otherwise manage incoming and outgoing optical fibers in a telecommunications facility. While the optical fibers have been omitted from all of the drawings except FIGS. 2 and 3 (which are discussed in detail below), a brief description of the optical fiber routes through the fiber management system will be useful for clarity. Generally, one or more outside fiber cables enter the telecommunications facility and are fed to one or more of the rack units 101 held by the rack 100. As described in more detail with reference to FIGS. 2 and 3 below, the incoming fiber cables include a plurality of bundled individual optical fibers, which are separated and routed to one or more other optical fibers or optical devices in the rack units 101. Outgoing fibers exit the rack units 101 and are routed to other equipment inside or outside the telecommunications facility. In large scale applications, such as in a regional telecommunications carrier for an urban area, whole rooms might be filled with racks similar to the one shown in FIG. 1.

Also, while rack 100 is shown in FIG. 1 with nine identical rack units 101 mounted thereon, any number of rack units can be mounted to the rack 100. In addition, the size and shape of the rack units 101 coupled to the rack may vary depending on the particular needs of the user. For example, the width, depth, and thickness of the rack units may differ, the overall shape of the rack units may vary, the specific components of the rack units may vary, and the like.

Figure 2:
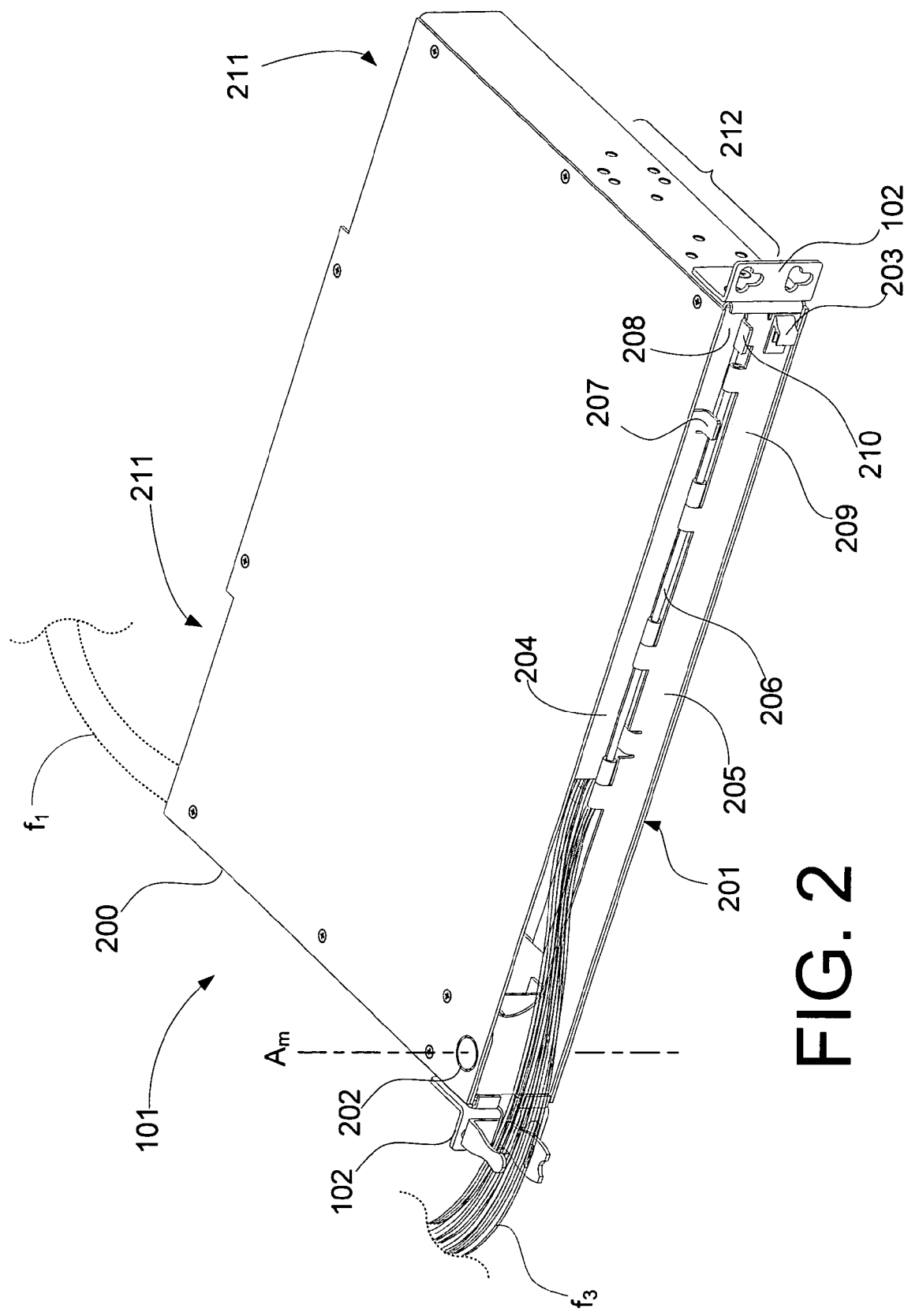
FIG. 2 is a perspective view of the rack unit of FIG. 1.

FIGS. 2-5 show a representative rack unit 101 in more detail. Generally, the rack unit 101 includes a housing or chassis 200, and a module 201 coupled to the chassis 200 for managing a plurality of fibers. The module 201 is coupled to the chassis 200 by a module hinge 202, which defines a module axis $A_m$ about which the module 201 is pivotable relative to the chassis 200. In this manner, the module 201 is pivotable between a first position (shown in FIG. 2), in which the module 201 is at least partially enclosed by the chassis 200, and a second position (shown in FIG. 3), in which the module 201 is substantially extended from the chassis to allow a user to access the fibers managed by the module 201. As best shown in FIG. 2, when the module 201 is in the first, retracted position, the module 201 is held in place by a latch 203. To extend the module 201 from the chassis 200, the user opens the latch 203 and pulls the module 201 out to the extended position shown in FIG. 3.

While the chassis 200 is shown as being a generally rectangular enclosure, having substantially planar top, bottom, side, and back surfaces, numerous other chassis configurations are also possible, as long as the chassis is capable of coupling the module to the rack and supporting the module. By way of example, one or more of the sides of the chassis might be omitted or have a different shape, the chassis could be an open framework with no sides at all, or the chassis could simply include a bracket for securing the hinge 202 to a rack with no framework or sides at all.

Also, while the module 201 is shown and described as being coupled to the chassis 200 by module hinge 202, the module 201 might be coupled to the chassis 200 in numerous other configurations. In one alternative, the module 201 could be coupled to the chassis 200 in a drawer configuration, with the module 201 being slidable in and out of the chassis 200. In another alternative, the chassis could be omitted entirely, with the module 201 being connectable directly to the rack 100.

Figure 3:
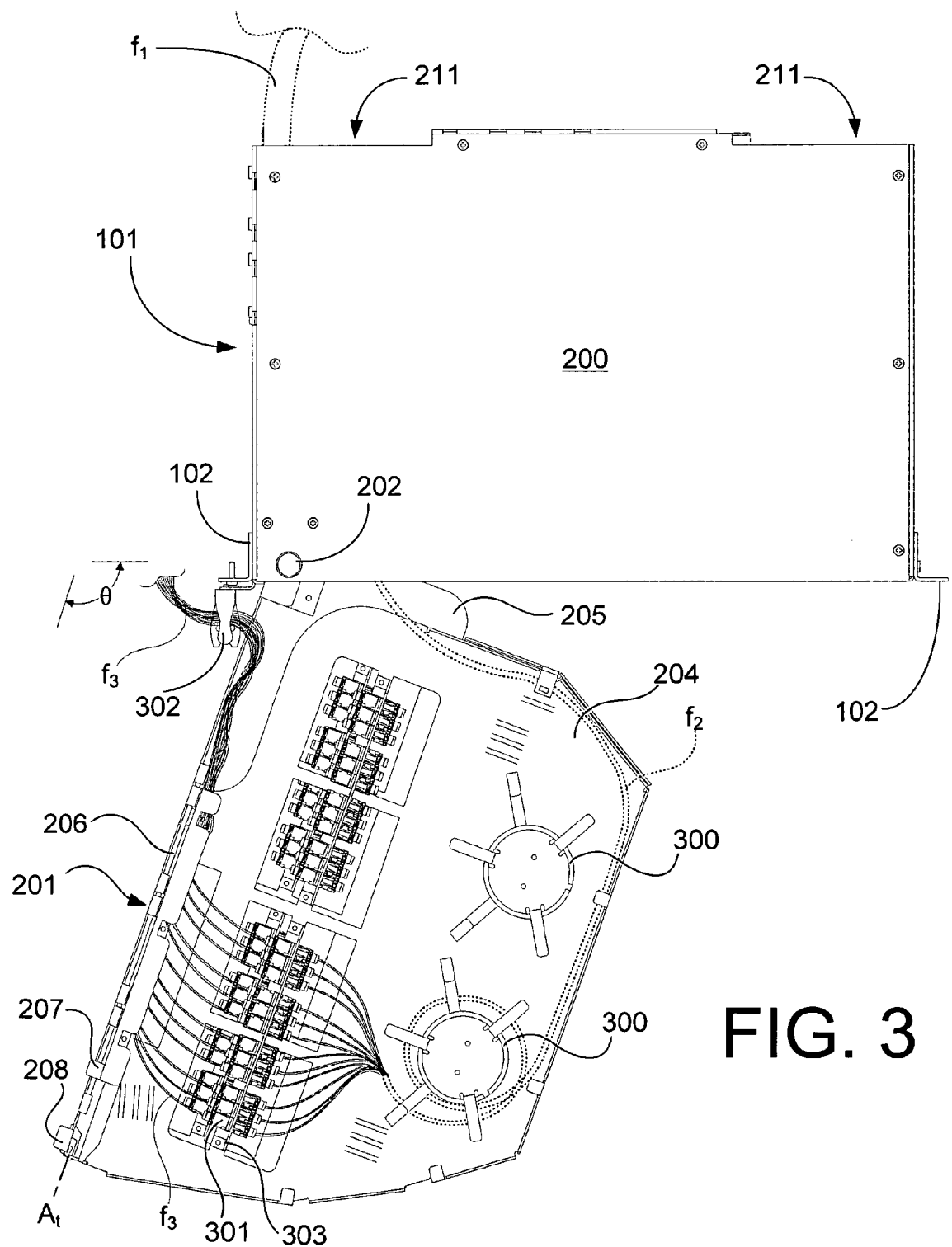
FIG. 3 is a plan view of the rack unit of FIG. 1, showing a module pivoted out in an extended position.

FIG. 3 shows module 201 being pivotable through an angle (θ). Preferably, angle (θ) is greater than 90 degrees relative to the chassis 200 to provide improved access to the managed fibers and to provide additional clearance between the module 201 and the front of the chassis 200. In one implementation, the angle (θ) is between about 90 and about 110 degrees. In another implementation, the angle (θ) is between about 100 and about 110 degrees.

Figure 4:
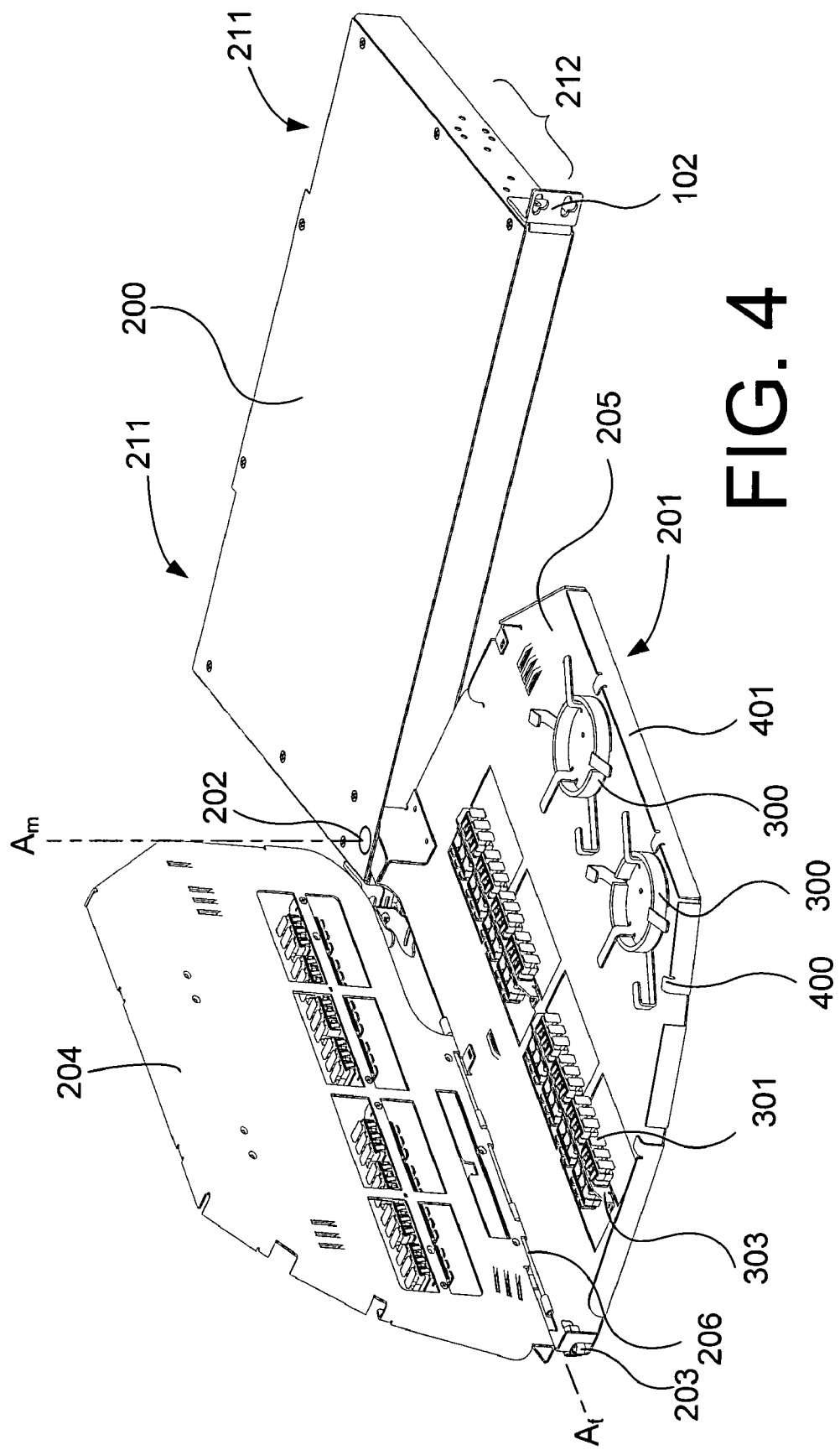
FIG. 4 is a perspective view of the rack unit of FIG. 1, with the module pivoted out in an extended position and a first tray in a raised position.
Figure 5:
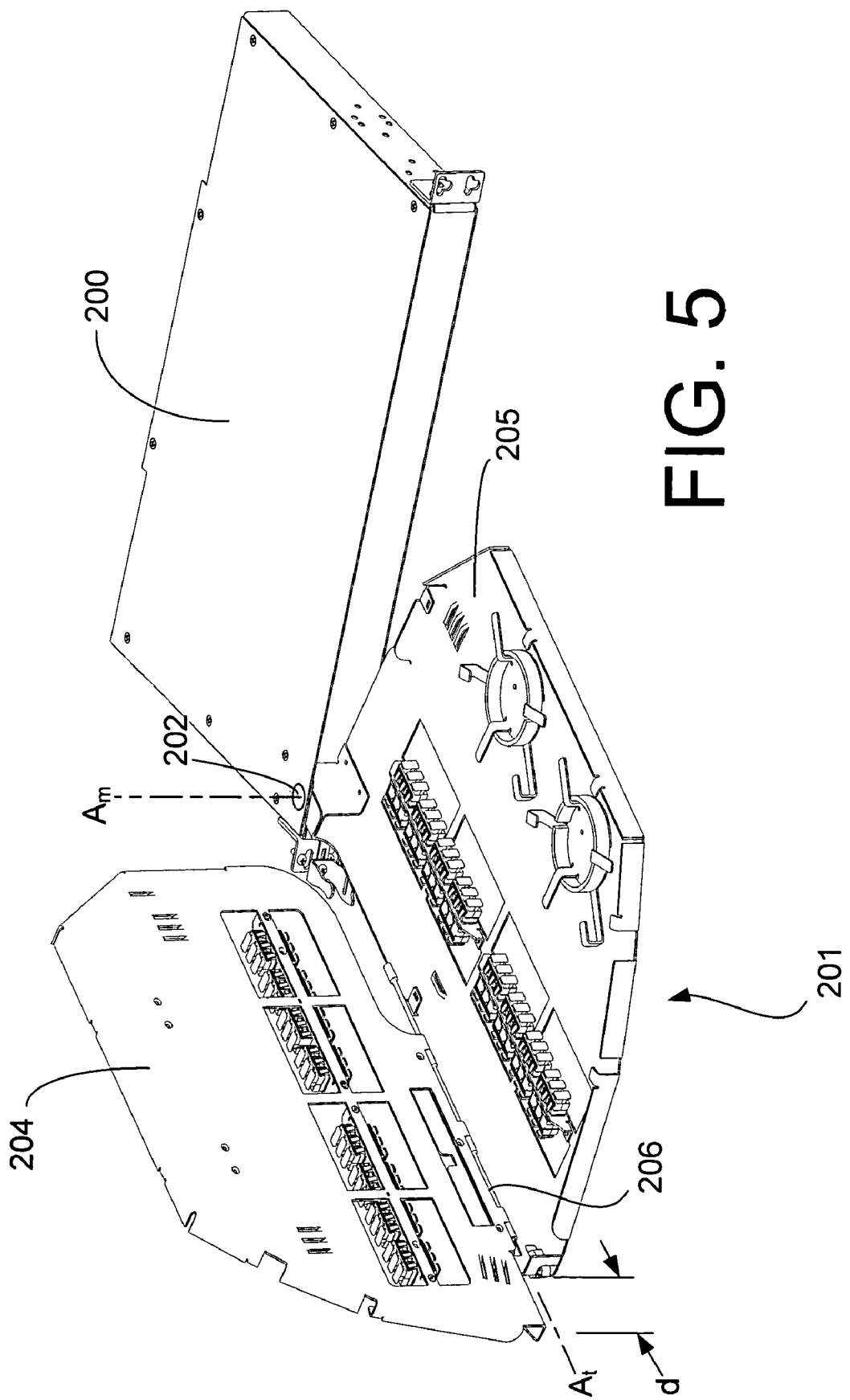
FIG. 5 is a perspective view of the rack unit of FIG. 1, with the module pivoted out in an extended position, and the first tray in a raised position and slid out relative to a second tray.

FIGS. 2, 4, and 5 show the module 201 having a plurality of stacked trays. In the illustrated implementation, there are two stacked trays, including at least a first or upper tray 204 and a second or base tray 205. The base tray 205 is coupled to the chassis 200 via the module hinge 202 to enable the module 201, including the stacked tray arrangement, to move between the enclosed and extended positions.

As best shown in FIGS. 4 and 5, the upper tray 204 is moveable relative to the base tray 205. In the illustrated implementation, the upper tray 204 is pivotally coupled to the base tray 205 at a tray hinge 206. The tray hinge 206 defines a tray axis $A_t$ about which the upper tray 204 is pivotable relative to base tray 205. In the implementation shown, the base tray 205 is coupled directly to the module hinge 202, and is fixed against rotation about the tray axis $A_t$. However, in other implementations, the base tray 205 may be configured to pivot about the tray axis $A_t$ by, for example, coupling the base tray 205 to the module hinge 202 via an additional mounting member (not shown). In one implementation, tray axis $A_t$ is not parallel to the module axis $A_m$, and in another implementation, the tray axis $A_t$ is substantially perpendicular to the module axis $A_m$. Also, while the plurality of trays is shown and described as a pair of trays for clarity, any number of additional pivotable trays may also be provided. These additional trays may be coupled in substantially the same manner as the upper tray described herein, or in other moveable arrangements with respect to the base tray.

In this manner, the upper tray 204 is pivotable between a lowered position (shown in FIGS. 2 and 3) for storage in the chassis 200, and a raised position (shown in FIG. 4) to provide access to the fibers managed by the base tray 205. When the upper tray 204 is in the lowered position, it is supported by the tray hinge 206 along one edge and, as best shown in FIG. 4, by a plurality of rest tabs 400 and a vertical edge 401 formed about the perimeter of the base tray 205.

When the upper tray is in the raised position, the upper tray 204 may be past its tipping point. In that case, stop tabs 207 and 208 (best shown in FIG. 2) protruding from the upper and base trays, respectively, abut the front surfaces 209 and 210 of the lower and upper trays, respectively, to prevent the upper tray 204 from pivoting beyond a desired point. In one implementation, the upper tray 204 is allowed to pivot through an angle of at least about 90 degrees relative to the base tray 205. In another implementation, the upper tray 204 is pivotable through an angle of between about 90 degrees and about 100 degrees. Of course, the upper tray 204 may also be pivotable by less than 90 degrees relative to the base tray, in which case, the upper tray may be held in the raised position by suitable known holding means, such as a prop arm, a detent mechanism, a magnet, a ratcheting mechanism, a latch, and the like.

FIG. 3 shows an incoming plant fiber-cable $f_1$ comprising a well protected bundle of individual fibers (usually 12 or 24 fibers) entering the rack unit 101 through openings 211 in the back of the chassis 200. The individual fibers are then separated and routed through one or more sections of conventional bend-limiting tubing $f_2$. The sections of bend-limiting tubing $f_2$ protect the fibers and prevent them from being bent beyond an acceptable radius, since that could cause transmission losses and/or breakage of the fibers. The sections of bend-limiting tubing $f_2$ are then looped around spools or reels 300 in the trays 204 and 205 to provide the desired amount of slack (typically ~1.5 meters). The individual fibers then emerge from the bend-limiting tubing and are connected to one or more outgoing fibers ($f_3$) or optical devices (not shown) via a plurality of fiber connectors 301. The individual outgoing fibers ($f_3$) exit the rack unit 101 through an opening in the front of the module 201, and are held in place at the front corner of the rack unit 101 by a tether 302 for convenient routing to other locations in the user's facility.

Only one incoming fiber cable containing twelve individual incoming optical fibers is shown in FIG. 3 for clarity. However, it should be understood that one or more additional incoming fiber cables may be input to each rack unit. In addition, each incoming fiber cable may include more than twelve individual optical fibers (typically, twenty-four). For example, the module 201 illustrated in the figures is designed to manage forty-eight fiber connections. If filled to capacity, the module 201 might have two incoming fiber cables, each holding twenty-four individual incoming optical fibers. The individual optical fibers would then be routed through sections of bend-limiting tubing. Typically, four sections of bend-limiting tubing would be used, with two sections of twelve fibers each being managed by each of trays 204 and 205, in the same manner as the fibers shown in FIG. 3.

As shown in FIGS. 3 and 4, the fiber connectors 301 are mounted along the length of each of trays 204 and 205, and are held in place by fiber mounts 303. As shown in the drawings, the connectors 301 are patch connectors, with two groups of twelve connectors being positioned along the length of each tray. However, any suitable type and number of connectors and/or optical devices could be used in addition to or in place of the patch connectors, depending on the needs of the user. Other suitable types of connectors and optical devices include splices, attenuators, connectors, switches, multiplexers, splitters/combiners, and the like. By way of example, the base tray 205 might be provided with one or more splice cassettes, while the upper tray 204 is provided with twenty-four patch connectors, or both the upper and base trays 204 and 205 might be provided with splice cassettes.

As the use of optical fibers has increased, rack space has become increasingly valuable. Accordingly, it is desirable to maximize the number of fibers that a rack unit of a given thickness (t) is able to manage, without sacrificing ease of access to the managed fibers. The rack unit 101 according to the foregoing description is capable of managing forty-eight incoming and forty-eight outgoing fibers, in a rack unit having a thickness (t) of two inches or less, while providing easy, unobstructed access to the managed fibers. In one particular implementation, the actual thickness (t) of the rack unit 101 is between about 1.6 and about 1.9 inches. More specifically, the thickness can be between about 1.7 and 1.8 inches. This configuration also allows the outgoing fibers to exit the rack unit 101 from the front face of the rack unit 101 for convenient routing to other equipment or the like. Of course, this configuration could be used to manage less than forty-eight incoming and forty-eight outgoing fibers. Moreover, the rack units may be adapted to manage more than forty-eight incoming and forty-eight outgoing fibers by, for example, changing the placement of the fiber connectors on the trays, staggering the fiber connectors on the trays, adding additional pivotable trays, increasing the rack unit thickness (t), and the like.

In some instances, there may not be sufficient clearance between the upper tray 204 and the front surface of the chassis 200 (or an overhead piece of equipment on the same rack) to allow the upper tray 204 to be lifted into the raised position of FIG. 4. This might be the case where, for example, a large number of fibers exits through the front of another rack unit located above the rack unit having the tray that is to be lifted. To overcome this problem, as shown in FIG. 5, the upper tray 204 is slidable a distance (d) away from the front of the chassis 200 (in a direction substantially parallel to the tray axis $A_t$), relative to the base tray 205. This is preferably accomplished by allowing the upper tray 204 to slide axially along the tray hinge 206. However, numerous other ways of making one or more upper trays slidable relative to a base tray will be readily apparent to one of ordinary skill in the art. In one implementation, tray sliding distance (d) is at least about 10 millimeters relative to the base tray 205. Specifically, distance (d) can be between about 20 and about 60 millimeters, or even more specifically, between about 40 and about 50 millimeters.

Mounting Kit

Racks typically come in one of a number of standard widths, including 515 millimeters, nineteen inches, and twenty-three inches. It is desirable for a single size of rack unit to be mountable in any of these standard rack sizes. To allow the rack unit 101 to be mounted in each of these standard rack sizes, a kit is provided with different brackets to support mounting on different sized racks.

Figure 6:
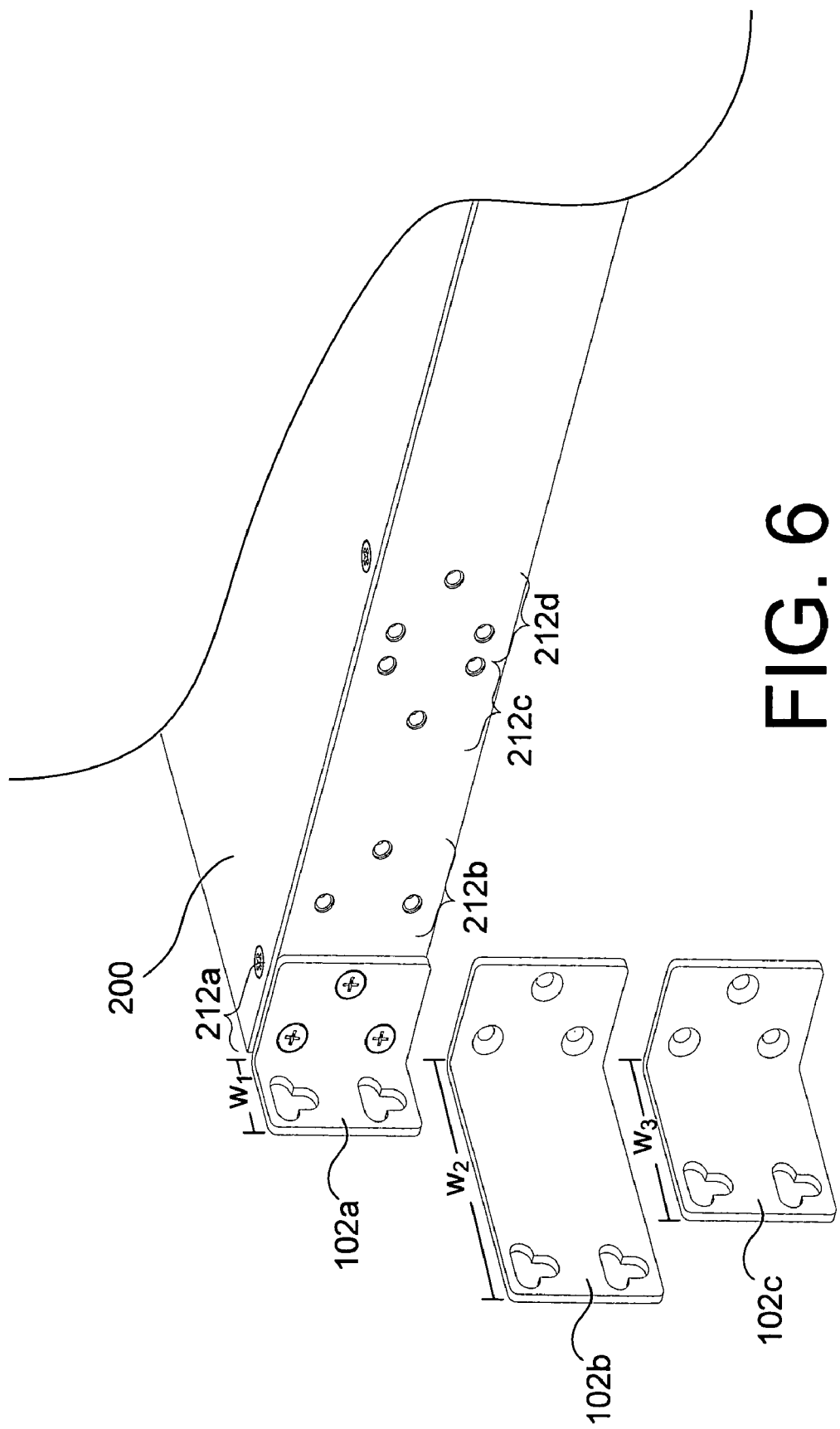
FIG. 6 is an enlarged detail view of the right side of the rack unit of FIG. 1, showing several brackets usable with the rack unit.

FIG. 6 illustrates one exemplary kit that includes three different sets of brackets 102a, 102b, and 102c. Brackets 102a each have a width ($w_1$) of about 0.875 inches and are usable to mount the rack unit 101 on a nineteen inch rack, brackets 102b each have a width ($w_2$) of about 2.875 inches and are usable to mount the rack unit 101 on a twenty-three inch rack, and brackets 102c each have a width ($W_3$) of about 1.513 inches and are usable to mount the rack unit 101 on a 515 millimeter rack. Of course, brackets of other sizes may be used to mount rack units to racks having other rack widths as well.

When mounting the rack unit 101, the user simply selects the set of brackets corresponding to the width of the rack on which the rack unit 101 is to be mounted and attaches the brackets 102 to the sides of the rack unit 101 and to the mounting holes 103 in the vertical sides of the rack 100.

As shown in FIG. 1, the front faces of the rack units 101 are mounted flush with the rack 100. However, in some instances, it may be desirable to mount one or more rack units 101 with the front face of the rack units protruding beyond the front of rack 100. To provide flexibility for various mounting positions, the rack unit 101 is preferably provided with adjustable mounting features, such that the brackets 102 can be coupled to the chassis in at least two different front-to-back positions. In the example shown in FIG. 2, the adjustable mounting features comprise multiple sets of mounting holes 212 formed in the side surfaces of the chassis 200. In particular, as shown in FIG. 6, four sets of mounting holes 212a, 212b, 212c, and 212d are provided, such that the rack unit 101 can be mounted at four separate front-to-rear mounting depths in the rack 100. However, it should be understood that any number of discreet sets of mounting holes could be provided at any desired location along the sides of the chassis 200. Alternatively, the adjustable mounting features could comprise elongated mounting slots (not shown) formed along all or part of the length of the sides of chassis 200 to allow the rack unit 101 to be mounted at any desired depth in the rack 100. Moreover, the adjustable mounting features could be located in other locations of the chassis, such as on the top, bottom, or back surfaces of the chassis 200.

In one implementation, the chassis 200 and module 201 are made of steel, and are formed by conventional manufacturing processes, such as stamping, bending, machining, welding, and the like. Of course, the components of fiber management apparatus and kit may be made of any other suitable material, such as, for example, plastic, fiberglass, polymers, carbon fiber, other metals, combinations thereof, and the like, and may be made by molding, extrusion, thermoforming, or any other suitable manufacturing process.

Operation

Once optical fibers are installed in a fiber management apparatus, there is still a need to access the fibers and connections to, for example, perform testing, connect patch fibers, splice fibers, reroute fibers, or otherwise service one or more fibers or fiber optic devices. In conventional fiber management apparatuses it is often difficult or cumbersome to access the fibers managed by the fiber management apparatuses due to, for example, tightly packed components, small clearances between moving parts, and the like.

Figure 7:
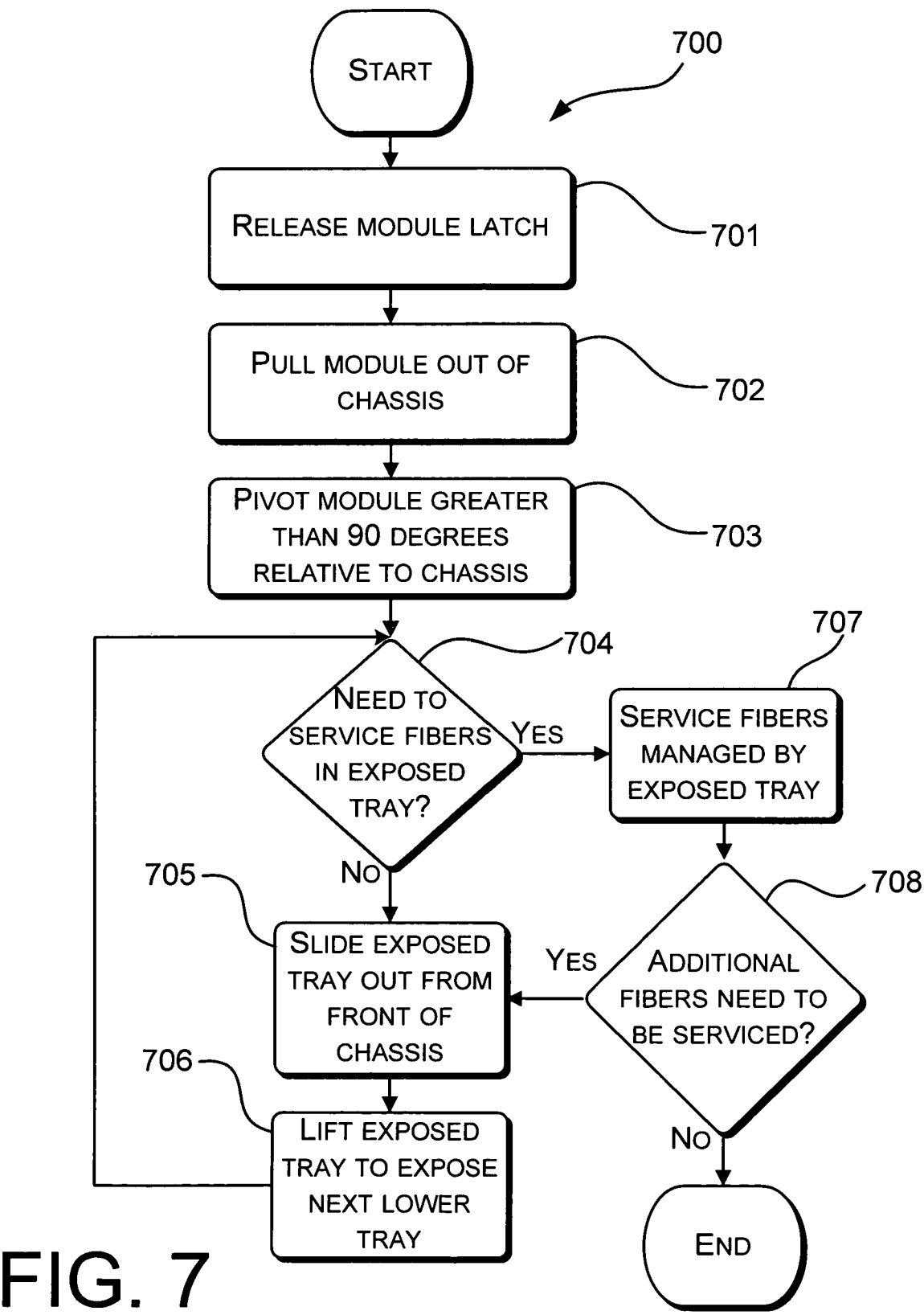
FIG. 7 is a flow chart showing one exemplary method of configuring a fiber management apparatus.

FIG. 7 illustrates one exemplary method 700 of managing fibers using a fiber management apparatus having multiple trays, which provides easy unobstructed access to the fibers and fiber optic devices that are managed by the trays. Once it is determined that some form of service needs to be performed on one or more of the optical fibers, the user begins by determining which rack unit on the rack holds the fiber or fibers that need service. At 701 the user releases the module latch of the identified rack unit to allow the module to be extended from the chassis. Next, at 702, the user pulls the module outward from the chassis to the extended position (it should be noted that this step may include swinging the module outward if the module is coupled to the chassis at a hinge, as shown in FIG. 3, or sliding the module out if the module is provided as a drawer on sliders). In the case where the module is hingedly connected to the chassis, the user proceeds at 703 to pivot the module greater than 90 degrees relative to the chassis to provide ample access to the fibers managed by the module.

In 704, the user determines whether the fiber(s) or device(s) that need to be serviced are in the currently exposed tray (currently the first or upper tray). If not, the user proceeds at 705 to slide the exposed tray outward, away from the front of the chassis, to provide additional clearance between the currently exposed tray and the front of the chassis. Then in 706 the user lifts the exposed tray to expose the next lower tray (the second tray, which now becomes the exposed tray). The user then returns to 704 and determines whether the fiber(s) or device(s) that need service are in the newly exposed tray. If not, the user repeats the sliding and lifting at 705 and 706 until the fiber(s) or device(s) that need to be serviced are in the exposed tray (potentially the third, fourth, ... or $n^{th}$ tray.

If the user determines at 704 that the fiber(s) or device(s) that need to be serviced are in the currently exposed tray, the user proceeds at 707 to perform the needed service. Once the service of the fiber(s) or device(s) in the exposed tray is complete, the user determines whether additional fiber(s) or device(s) other than those in the exposed tray need service. If not, the user can lower any lifted trays and return the module to the enclosed position by swinging or sliding the module back into the chassis. If, however, additional fiber(s) or device(s) need service, the user repeats the sliding and lifting at 705 and 706, and servicing at 707 until all of the fiber(s) and device(s) in the module that need service have been serviced.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A fiber management apparatus comprising:
a module adapted to manage fibers, the module comprising a plurality of trays, the plurality of trays including a first tray and a second tray, the first tray being coupled to the second tray at a tray axis,
wherein the first tray is pivotable about the tray axis relative to the second tray,
wherein the first tray is slidable relative to the second tray in a direction substantially parallel to the tray axis; and
wherein each of the first and second trays comprises a fiber mount configured to hold at least one of (i) a plurality of fiber patch connections, or (ii) a splice cassette.

2. A fiber management apparatus according to claim 1, further comprising a chassis, to which the module is coupled, the module being supported by the chassis.

3. A fiber management apparatus according to claim 2, wherein the module is coupled to the chassis at a hinge defining a module axis, such that the module is pivotable about the module axis between a first position in which the module is at least partially enclosed by the chassis, and a second position in which the module is substantially extended from the chassis.

4. A fiber management apparatus according to claim 2, the module being coupled to the chassis at a hinge defining a module axis, such that the module is pivotable about the module axis through an angle greater than 90 degrees relative to the chassis.

5. A fiber management apparatus according to claim 2, further comprising a rack, to which the chassis is coupled, the chassis being supported by the rack.

6. A fiber management apparatus according to claim 5, wherein the chassis includes adjustable mounting features, such that the chassis can be coupled to the rack in at least two different front-to-back positions.

7. A fiber management apparatus according to claim 1, wherein the second tray is a fixed tray, which is not pivotable about the tray axis.

8. A fiber management apparatus according to claim 1, further comprising a chassis to which the module is coupled, wherein the chassis has a maximum thickness (t) of at most two inches, and wherein the module is configured to hold at least forty-eight patch connections, each patch connection comprising an input fiber and an output fiber.

9. A fiber management apparatus comprising: a chassis; and
a module adapted to manage fibers, the module being coupled to the chassis at a hinge defining a module axis, such that the module is pivotable about the module axis through an angle greater than 90 degrees relative to the chassis,
wherein the module comprises a plurality of trays, the plurality of trays including a first tray and a second tray,
wherein the first tray is coupled to the second tray, and
wherein the plurality of trays is constrained to pivot together about the module axis, and
wherein the first tray of the plurality of trays is pivotable about a tray axis relative to the second tray of the plurality of trays, the tray axis being non-parallel with the module axis.

10. A fiber management apparatus according to claim 9, wherein the module is pivotable about the module axis through an angle of between about 90 degrees and about 110 degrees.

11. A fiber management apparatus according to claim 9, wherein the module is pivotable about the module axis through an angle of between about 100 degrees and about 110 degrees.

12. A fiber management apparatus according to claim 9, wherein the first tray is slidable relative to the second tray in a direction substantially parallel to the tray axis.

13. A fiber management apparatus according to claim 9, wherein the chassis includes adjustable mounting features, such that the chassis can be coupled to a rack in at least two different front-to-back positions.

14. A method of managing fibers, comprising:
pulling a module out of a chassis, the module having a first tray and a second tray, the first tray being coupled to the second tray at a tray axis;
sliding the first tray relative to the second tray in a direction substantially parallel to the tray axis;
lifting the first tray to expose the second tray; and
repeating the sliding and lifting steps at least once on the second tray, to expose at least a third one of the trays.

15. A method of managing fibers according to claim 14, further comprising, after the pulling step and prior to the sliding step, pivoting the module greater than 90 degrees relative to the chassis.

16. A method of managing fibers according to claim 15, further comprising, prior to the pulling step, releasing a module latch to allow the module to be pulled out of the chassis.

17. A fiber management apparatus comprising:
a module adapted to manage fibers, the module comprising a plurality of trays, the plurality of trays including a first tray and a second tray,
wherein the first tray is pivotably coupled to the second tray at a tray axis,
wherein the plurality of trays is constrained to pivot together about the module axis,
wherein the tray axis is non-parallel with the module axis, and
wherein the first and second trays each contain at least one fiber connector.

18. A fiber management apparatus according to claim 17, further comprising a chassis, to which the module is coupled, the module being supported by the chassis.

19. A fiber management apparatus according to claim 11, wherein the chassis has a maximum thickness (t) of at most two inches, and wherein the module is configured to hold at least forty-eight fiber connections, each fiber connection comprising an input fiber and an output fiber.

* * * * *